G. W. MASCORD.
ADJUSTABLE BEARING FOR ROTARY CYLINDER MACHINES.
APPLICATION FILED SEPT. 13, 1912.
1,063,811.
Patented June 3, 1913.
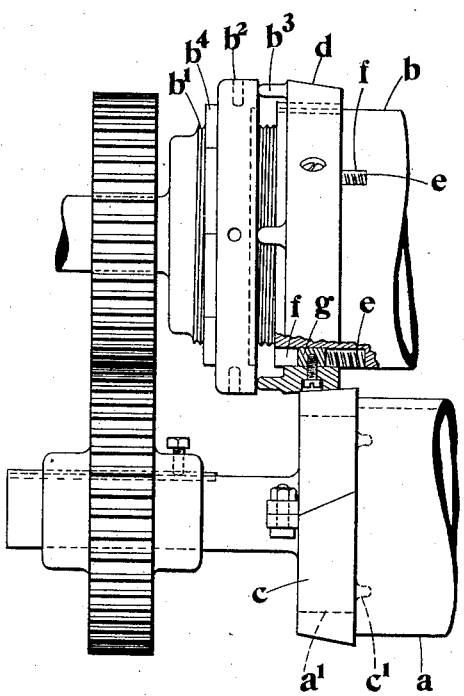
Witnesses—
Stanley Wood
Robert Owen Hughes
Inventor
George William Mascord
by
Attorney.

UNITED STATES PATENT OFFICE.

GEORGE WILLIAM MASCORD, OF BARNES, LONDON, ENGLAND.

ADJUSTABLE BEARING FOR ROTARY-CYLINDER MACHINES.

1,063,811.

Specification of Letters Patent.

Patented June 3, 1913.

Application filed September 13, 1912. Serial No. 720,260.

*To all whom it may concern:*

Be it known that I, GEORGE WILLIAM MASCORD, a subject of the King of Great Britain and Ireland, residing at 5 The Crescent, Barnes, London, S. W., England, have invented certain new and useful Adjustable Bearings for Rotary-Cylinder Machines, of which the following is a specification.

This invention relates to machines having rotary cylinders, such as printing machines, calenders, letter copying presses, rolling mills, mangling machines and the like, and has for its object to provide means whereby pairs of rotatable cylinders may be maintained at a determined but adjustable distance apart. In the case of printing machines this has been secured by providing one of the cylinders with split or expansible annular bearing surfaces capable of longitudinal movement on conical seatings for the adjustment of the distance between the cylinders.

According to the invention I provide at each end of each cylinder a conical bearing surface, the inclination of the bearing surfaces of one cylinder being opposite to that of the bearing surfaces of the second cylinder, so that when the cylinders are brought together, the one cylinder may be borne upon or against the other by the contact of their respective bearing surfaces. According to the invention, moreover, the bearing surfaces of one or both the cylinders are provided to be longitudinally movable along the axis of the cylinder so that thus by the adjustment of the position of the bearing members of one cylinder relatively to those of the other cylinder, the distance between them may be varied as found desirable.

The application of the invention is illustrated in the accompanying diagrammatic drawing which represents one end of a pair of cylinders of a printing machine provided with bearings according to the invention, in elevation.

In carrying the invention into effect according to the particular construction, at each end of the cylinder $a$ there is formed a shoulder $a^1$ adapted to receive a bearing member or bearer $c$ which is constructed in two semi-circular parts pivoted or hinged together so as to be readily removable, and adapted to be clamped upon the shoulder $a^1$ of the cylinder referred to, the outer or bearing faces of the two parts being coned, and pins $c^1$ being advantageously provided on the inner side face thereof to fit into suitable holes or recesses provided to receive them in the adjacent end of the cylinder $a$, so that thus all danger of rotary movement of the bearer relatively to the cylinder is obviated. The bearers $d$ of the second cylinder $b$ are provided to be slidable upon their respective seatings at each end of the cylinder and each is adjusted in its position by means of a nut $b^2$ and lock nut $b^4$ screwing upon a threaded portion $b^1$ of the end of the cylinder and adapted to contact with the outer side face of the bearer or with suitable projections $b^3$ mounted thereon.

The bearer $d$ is advantageously pressed toward the nut $b^2$ by the action of springs $e$ which tend to retain the bearer in its adjusted position. The springs $e$ are disposed in slots or recesses $f$ in the surface of the cylinder $b$ and press against lugs $g$ mounted on the inner surface of the bearer $d$ and projecting into the slots or recesses $f$.

When it is desired to vary the distance between the cylinders it is only necessary to tighten or slacken the nuts $b^2$ $b^4$ upon the second cylinder $b$ and to move the respective bearers $d$ of the said cylinder to the new position.

It will be understood that the invention is not limited to any particular construction of the cylinders or of the bearers, nor to the particular manner in which the adjustment is effected.

The invention is especially suitable for application to cylinders which are intended to exercise pressure for a part only of each revolution, as may be the case, for example, with the impression and plate cylinders, in printing machines, since there is no tendency for the one cylinder to drop or move toward the other when passing off the plate or article upon which pressure is exercised, as the bearers are always in contact. With cylinders mounted in the usual manner without using bearers this tendency to drop of the one cylinder toward the other results in damage to and thickening of the edges of the printing plates so impairing the quality of the output. Further with cylinders equipped with bearers of the usual type, the faces of which are disposed parallel or approximately parallel with the surface of the cylinder, adjustment of the contacting surfaces of bearers cannot be made with facility when it is desired to vary the distance between axes of same.

What I claim as my invention and desire to secure by Letters Patent is:—

The combination with the rotary cylinders of a conical bearing member at the extremity of one cylinder, a conical bearing member slidably mounted at the extremity of a second or adjacent cylinder, said conical members having their conical surfaces oppositely disposed and contacting with one another, the second cylinder having recesses, a reduced screw-threaded portion on the second cylinder and projecting beyond the conical member mounted thereon, lugs on the conical member of the second cylinder projecting into the said recesses, springs in said recesses bearing upon said lugs and pressing the conical member toward the extremity, projections on said conical member, a nut screwing on the screwed portion and bearing against the projections substantially as described.

In testimony whereof I have hereunto signed my name to this specification in the presence of two subscribing witnesses.

GEORGE WILLIAM MASCORD.

Witnesses:
ROBERT OWEN HUGHES,
H. D. JAMESON.

---

Copies of this patent may be obtained for five cents each, by addressing the "Commissioner of Patents, Washington, D. C."